United States Patent
Shekhar et al.

(10) Patent No.: US 10,638,176 B2
(45) Date of Patent: Apr. 28, 2020

(54) CHANNEL PREFERENCE SCORING FOR USERS BASED ON CHANNEL WATCHING AND BROWSING BEHAVIOR

(71) Applicant: Adobe Inc., San Jose, CA (US)

(72) Inventors: Sumit Shekhar, Bangalore (IN); Payal Bajaj, Bangalore (IN); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/927,407

(22) Filed: Oct. 29, 2015

(65) Prior Publication Data
US 2017/0127132 A1 May 4, 2017

(51) Int. Cl.
*H04N 21/25* (2011.01)
*H04N 21/45* (2011.01)
(Continued)

(52) U.S. Cl.
CPC ..... *H04N 21/252* (2013.01); *H04N 21/25891* (2013.01); *H04N 21/2668* (2013.01);
(Continued)

(58) Field of Classification Search
CPC ......... H04N 21/25891; H04N 21/2668; H04N 21/4532; H04N 21/4622; H04N 21/47205; H04N 21/4756; H04N 21/44222; H04N 21/4826; H04N 21/252; H04N 21/4755; H04N 21/6582; H04N 21/4661; H04N 21/2393; H04N 21/4668; H04N 21/4667; H04N 21/482; H04N 21/44204; H04N 21/4126
See application file for complete search history.

(56) References Cited

U.S. PATENT DOCUMENTS 8,584,166 B2 * 11/2013 Gunda ................... H04H 60/45
725/37
9,578,357 B2 * 2/2017 Wolf .................. H04N 21/4524
(Continued)

OTHER PUBLICATIONS

"Pay TV pass white paper", Retrieved at: http://tve.helpdocsonline.com/white-paper—on Aug. 12, 2015, 15 pages.
(Continued)

*Primary Examiner* — Mulugeta Mengesha
*Assistant Examiner* — Alazar Tilahun
(74) *Attorney, Agent, or Firm* — SBMC

(57) ABSTRACT

Multiple channels of audio/video (A/V) content in a system are available to users. A channel scoring system uses a user's channel watching behavior and channel browsing behavior to generate a channel preference score for various different channels in the system. The channel watching behavior refers to which channels the user watches. The channel browsing behavior refers to features describing the user's behavior when watching A/V content provided by a channel. Examples of these features include the hour of the day when the user watches the A/V content, the number and length of A/V content provided by the channel watched in a session, device preferences of the user, and so forth. Various actions can be taken based on the generated channel preference scores, such as recommending or otherwise promoting channels to the user.

20 Claims, 7 Drawing Sheets

(51) Int. Cl.
- *H04N 21/462* (2011.01)
- *H04N 21/41* (2011.01)
- *H04N 21/442* (2011.01)
- *H04N 21/2668* (2011.01)
- *H04N 21/258* (2011.01)
- *H04N 21/472* (2011.01)

(52) U.S. Cl.
CPC ... *H04N 21/4126* (2013.01); *H04N 21/44204* (2013.01); *H04N 21/44222* (2013.01); *H04N 21/4532* (2013.01); *H04N 21/4622* (2013.01); *H04N 21/47205* (2013.01)

(56) References Cited

U.S. PATENT DOCUMENTS

| | | | | |
|---|---|---|---|---|
| 2006/0155892 | A1* | 7/2006 | Sudoh | H04H 60/46 710/11 |
| 2011/0225608 | A1* | 9/2011 | Lopatecki | G06F 15/16 725/34 |
| 2015/0020092 | A1* | 1/2015 | Singal | H04N 21/4532 725/30 |
| 2015/0089517 | A1* | 3/2015 | Ruffini | H04N 21/25891 725/9 |
| 2015/0208120 | A1* | 7/2015 | Yao | H04N 21/25833 725/9 |
| 2016/0192006 | A1* | 6/2016 | Alfishawi | H04N 21/4668 725/32 |

OTHER PUBLICATIONS

"TV Everywhere 2.0: The Next Steps in Multiscreen", Park Associates, Mar. 2014 : https://www.parksassociates.com/report/tv-everywhere-2, Mar. 2014, 2 pages.

Adomavicius,"Toward the Next Generation of Recommender Systems: A Survey of the State-of-the-Art and Possible Extensions", IEEE Transactions on Knowledge and Data Engineering, vol. 17, No. 6, Jun. 2005, Jun. 6, 2005, pp. 734-749.

Ng,"Efficient and Effective Clustering Methods for Spatial Data Mining", Proc. of. International Conference on Very Large Databases, 1994, 12 pages.

* cited by examiner

CHANNEL PREFERENCE SCORING FOR USERS BASED ON CHANNEL WATCHING AND BROWSING BEHAVIOR

BACKGROUND

As computing technology has advanced, the types of different devices that can be used to watch audio/video (A/V) content has expanded, as has the number of video content sources. While users used to be limited to watching A/V content on their televisions received via broadcast radio waves, users are now able to watch A/V content on their computers, phones, televisions, etc., where that content can be received via the Internet, cellular data networks, cable television systems, and so forth. Given such wide variety of A/V content sources, each content provider typically desires to keep end users engaged with the content provider's own A/V content rather than A/V content from another content provider. However, it remains problematic for each content provider to know how to keep users engaged with their A/V content.

One technique that can be used to recommend A/V content to users to keep them engaged with a content provider is a collaborative recommendation technique that attempts to predict the utility of A/V content for a particular user based on the A/V content previously rated by other users. However, situations oftentimes arise in which few users switch from watching A/V content on one channel to watching A/V content on another channel. Such collaborative recommendation techniques are problematic because these collaborative recommendation techniques tend to give poor recommendations in situations in which very few users switch from watching A/V content on one channel to watching A/V content on another channel.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, the users of an A/V content playback system are grouped into one or more segments. The grouping of a user is based on a channel watching behavior of the user, which refers to which channels the user watches. The grouping of a user is also based on a channel browsing behavior of the user over a time period, which refers to features describing the user's behavior when watching A/V content provided by a channel. A channel preference score is generated for each individual channel of multiple different channels of A/V content for each user. These channel preferences scores are generated based on probabilities of the multiple users switching from one channel to another, the similarity of browsing behavior of a user to browsing behaviors of the other users of the multiple users in the multiple segments, the channel watching behavior of a user, and aggregate channel statistics of the multiple users. An action to promote or recommend at least one of the multiple channels to at least one of the users can also be taken based on the channel preference scores.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities, and thus reference may be made interchangeably to single or plural forms of the entities in the discussion.

DETAILED DESCRIPTION

Figure 1:
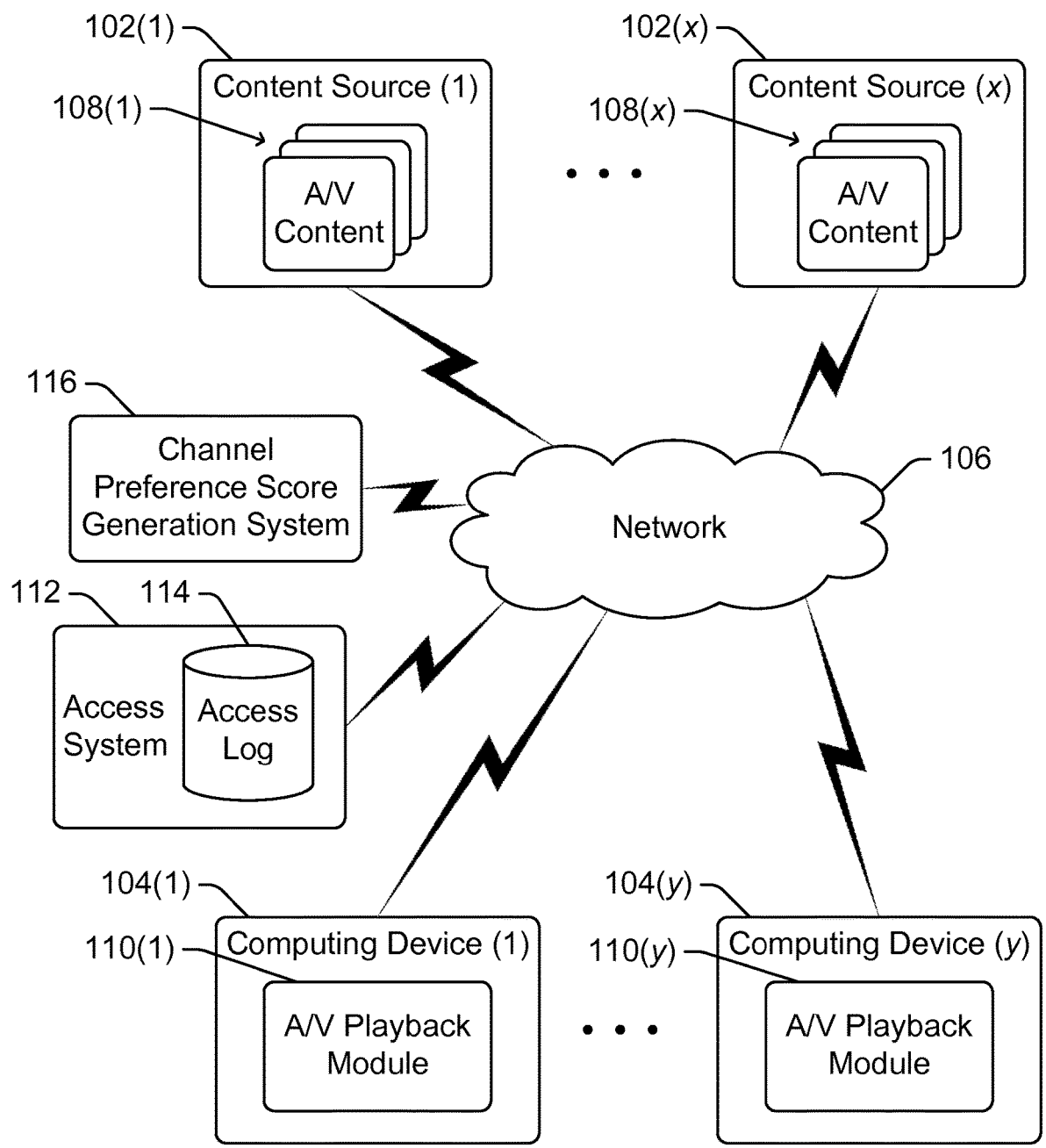
FIG. 1 illustrates an example system implementing the channel preference scoring for users in accordance with one or more embodiments.

Techniques for generating channel preference scores across different channels for a user are discussed herein. In particular, the techniques utilize a user's channel watching behavior and channel browsing behavior to generate, for each individual channel of multiple different channels, a channel preference score for the user. The channel watching behavior refers to which channels the user watches. The channel browsing behavior (also referred to herein as the "browsing behavior") refers to features describing the user's behavior when watching A/V content provided by a channel, such as the hour of the day when the user watches the A/V content, the number and length of different A/V content provided by the channel watched in a session (as discussed in more detail below), device preferences of the user, and so forth. Each channel can provide various different audio/video (A/V) content in a television-like experience. The A/V content refers to any type of content that can be displayed and/or played back audibly (e.g., live broadcast A/V content, previously recorded A/V content, and so forth).

The channel preference score of a particular channel for a user is a value indicating a likelihood that the A/V content on that particular channel will be of interest to the user. When generating the channel preference score for a user for a channel, the channel watching behavior of multiple users is used to identify segments of users who switch from one channel to another as well as channel switching statistics of the multiple users (including which channels are switched to from which other channels by users). Exemplar users in each segment representative of the segment are also identified, and the behavioral similarity of the user to exemplar users in each channel pair segment (based on the channel browsing behaviors of the user and the exemplar users) is generated. The channel preference score of a particular channel for a user is generated based on the probabilities of the user watching each of the multiple channels, the probabilities of users switching from one channel to another, and the behavioral similarity of the user to each segment.

In one or more embodiments, channel preference scores for a user are determined as follows. First, users are grouped into different segments based on their channel watching and browsing behaviors (e.g., channels watched and switching behavior between different channels). These segments include, for each pair of channels, a segment corresponding to switching from one channel in the channel pair to the other channel in the channel pair, and vice versa. For example, for two channels $CH_i$ and $CH_k$, there is a first segment that includes users that switch from channel $CH_i$ to channel $CH_k$, and a second segment that includes users that switch from channel $CH_k$ to channel $CH_i$. Users are assigned to the first segment or second segment based on the probability of the user switching from channel $CH_i$ to channel $CH_k$, and the probability of the user switching from channel $CH_k$ to channel $CH_i$. The channel preference scores for a user are then computed based on the proximity (similarity) of the user's browsing behavior to that of users in the different segments, the user's channel watching behavior and aggregate channel statistics. The aggregate channel statistics refer to statistics regarding the channel watching behavior and/or channel browsing behavior of multiple users across multiple channels. Thus, both channel browsing behavior and channel watching behavior of a user are factored into generation of the channel preference score of the user for a channel. The user's channel watching behavior and aggregate channel statistics are used to generate the channel preference scores for the user by determining the probabilities of the user watching each of multiple channels and the probabilities of users switching from one channel to another.

Among many other benefits, the techniques discussed herein enable discovery of user preferences for unexplored, but relevant channel content for a user. Moreover, by explicitly discovering segments of users based on channel watching behavior, potential issues of having only a few users switching channels can be resolved. Furthermore, the techniques discussed herein incorporate aggregate channel statistics to arrive at probabilistic channel preference scores for each user that are based on the channel watching behavior and/or channel browsing behavior of multiple users rather than on solely the individual user for which the channel preference score is being generated. The techniques discussed herein further allow for discovery of channel preference scores for a user for unexplored, but relevant channel content. Additionally, these techniques allow preferences of new users (e.g., with very little channel viewing history) to be discovered. The techniques discussed herein provide value to content providers by allowing channel preference scores to be generated for other channels of the content provider, and those one or more channels with the highest channel preference scores for the user can be promoted or recommended to the user. This improves the ability of the content provider to retain users, while at the same time providing users with content that is of interest to them but of which they may not have been aware.

The techniques discussed herein further allow for improved utilization of various resources in the system. For example, promotions for particular channels can be communicated over a network (e.g., by electronic mail, as streaming A/V content, etc.) to only those users with channel preference scores for those particular channels that exceed a threshold value, thereby reducing the number of users to which the promotions are communicated and reducing the network bandwidth used to communicate those promotions.

By way of another example, storage requirements for records regarding particular promotions can be reduced due to the number of users that receive the promotions being reduced (e.g., the promotions are communicated to only those users with channel preference scores for those particular channels that exceed a threshold value rather than all users). By way of yet another example, energy in users' devices can be conserved due to the users receiving promotions or recommendations for only those particular channels for which the user has a high enough channel preference score (e.g., a channel preference score that exceeds a threshold value). The user thus does not waste battery power (e.g., on his or her mobile device) viewing a promotion for a channel that the user is most likely not interested in due to a low channel preference score for the channel.

FIG. 1 illustrates an example system 100 implementing the channel preference scoring for users in accordance with one or more embodiments. System 100 includes multiple (x) content sources 102(1), . . . , 102(x), that can communicate with one or more (y) computing devices 104(1), . . . , 104(y) via a network 106. The network 106 can be a variety of different networks, such as the Internet, a local area network (LAN), a cellular or other phone network, an intranet, other public and/or proprietary networks, combinations thereof, and so forth. The system 100 is an A/V content playback system, allowing A/V content from content sources 102 to be played back by computing devices 104.

Each computing device 104 can be a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a wearable device (e.g., eyeglasses or a smart watch), dedicated audio/video playback devices, a game console, an automotive computer, and so forth. Thus, each computing device 104 may range from a full resource device with substantial memory and processor resources (e.g., personal computers, game consoles) to a low-resource device with limited memory and/or processing resources (e.g., traditional set-top boxes, hand-held game consoles). Different ones of the computing devices 104 can be the same or different types of computing devices.

Each content source 102(1), . . . , 102(x) can similarly be any of a variety of different types of computing devices capable of hosting A/V content 108(1), . . . , 108(x), respectively, that can be provided to an A/V playback module 110(1), . . . , 110(y) of computing devices 104(1), . . . , 104(y), respectively for playback. The A/V content 108 can be any type of A/V content, such as movies, sports shows or games, talk shows, sitcoms, news shows, tutorials, documentaries, and so forth. Similar to the discussion of computing devices 104, each content source 102 can be implemented by one or more of any of a variety of different types of devices, ranging from full resource devices with substantial memory and processor resources to low-resource devices with limited memory and/or processing resources.

Although A/V content 108 is discussed herein, it should be noted that the techniques discussed herein apply analogously to other types of content. For example, rather than A/V content, the content provided to the computing device 104 for playback may be only video content or only audio content. By way of another example, the content provided to the computing device 104 for playback may include other types of content (e.g., text or images) that are displayed or otherwise presented concurrently with the A/V content.

Each content source 102 provides one or more channels of A/V content 108. A channel refers to a collection of A/V content. The grouping of A/V content among the various channels is determined by the content sources and/or content source administrators. For example, a particular content source 102 may have one channel for sports A/V content, one channel for children's A/V content, one channel for history A/V content, one channel for science fiction A/V content, and so forth. Another channel may have both sports A/V content and science fiction A/V content. A/V content can include previously recorded content that is available on-demand when requested by the user, as well as live content (e.g., a stream or broadcast of content that is available at a time dictated by the content source 102 rather than in response to a user request). Each A/V playback module 110 provides, in conjunction with the content sources 102, a user interface (UI) allowing the user to select different channels as well as select particular A/V content from each channel. User input to change channels can be provided in various manners, such as selection of a channel change button displayed in the UI, selection of a channel change button on a remote control device, input of a particular channel number or name (such as by character selection or audio input), and so forth.

Figure 2:
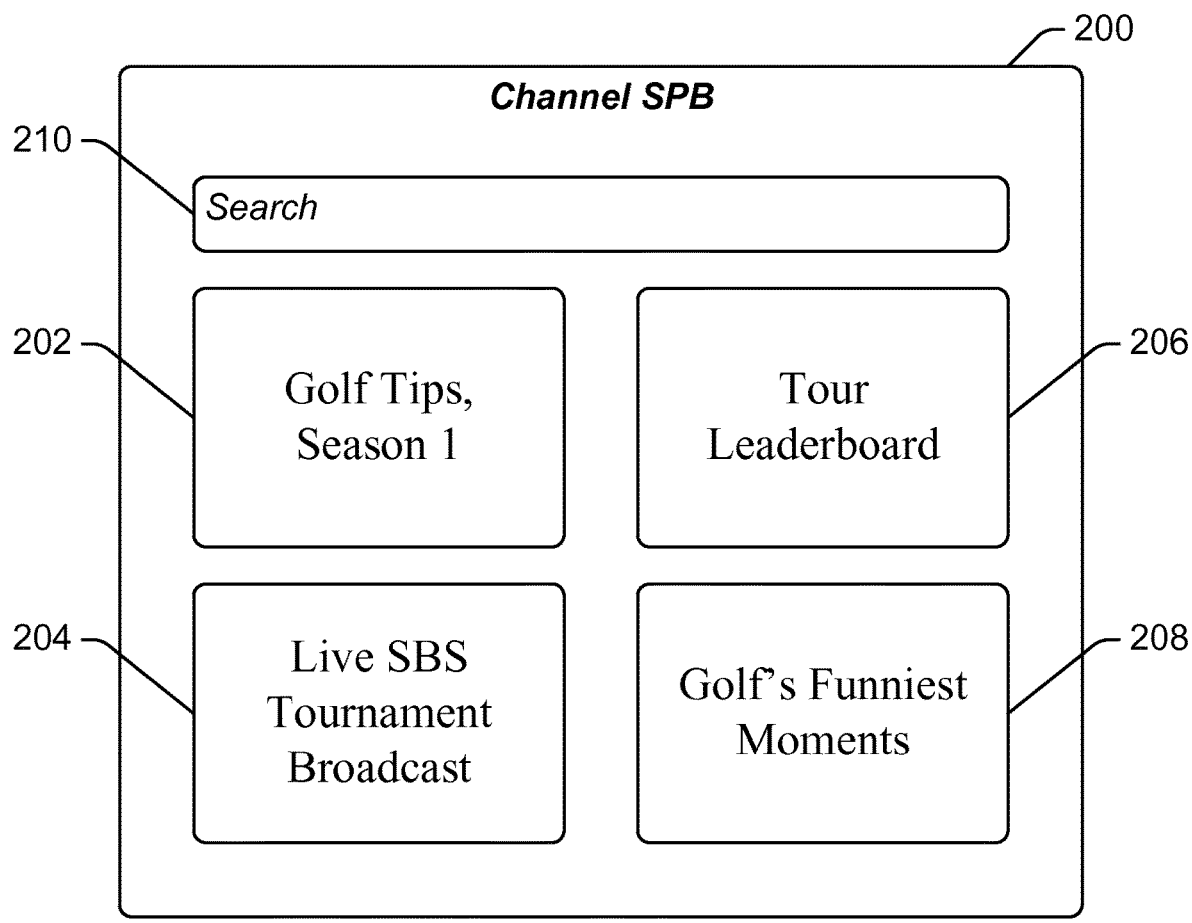
FIG. 2 illustrates an example interface for selecting A/V content in accordance with one or more embodiments.

FIG. 2 illustrates an example interface for selecting A/V content in accordance with one or more embodiments. In the example of FIG. 2, a user interface 200 for a channel identified as "Channel SPB" is displayed. Four different user-selectable buttons 202, 204, 206, and 208 are displayed. Each button 202-208 corresponds to particular A/V content, and the corresponding A/V content is played back to the user in response to selection of a button 202-208. For example, use selection of button 202 causes A/V content titled "Golf Tips, Season 1" to be played back, selection of button 204 causes A/V content titled "Live SBS Tournament Broadcast" to be played back, and so forth. A button can be selected in any of a variety of different manners, such as by clicking on the button with a mouse, touching the button via a touchscreen display, and so forth.

A search box 210 is also displayed, and the user can input a search term to search for content if desired. Such a search term can be input in any of a variety of different manners, such as typed using a keyboard, audibly, and so forth. In response to entry of the search term, various different A/V content options satisfying the search term are displayed or otherwise presented, and the user can select one of the displayed or otherwise presented A/V content options.

Returning to FIG. 1, an access system 112 maintains an access log 114 that is a log or record of various different users' accesses to A/V content 108. The access system 112 records various information in the access log 114 regarding which A/V content 108 is watched by a user, which channels are watched by a user, and so forth. A channel preference score generation system 116 uses the information recorded in the access log 114 to a generate channel preference score for each of one or more channels for a user of a computing device 104. It should be noted that a user can use multiple different computing devices 104, and that the various information regarding which A/V content 108 is watched by the user, which channels are watched by the user, and so forth is recorded in the access log 114. This recorded information from watching A/V content on multiple computing devices 104 can be used by the channel preference score generation system 116 to generate the channel preference scores for one or more channels for the user regardless of which computing device 104 the user is using at any given time.

A channel preference score of a particular channel for a user is a value that indicates a likelihood that the A/V content on that particular channel will be of interest to the user. Multiple channel preference scores can be generated for a user, one channel preference score for each of multiple different channels. Furthermore multiple channel preference scores (one channel preference score for each of multiple different channels) can be generated for each of multiple different users of the system 100. The generation of the channel preference scores is discussed in more detail below.

Although the access system 112 and the channel preference score generation system 116 are both illustrated as being individual systems, alternatively one or both of the access system 112 and the channel preference score generation system 116 can be implemented at least in part in other systems or components. For example, the access system 112 can be implemented at least in part in one or more of the content sources 102. Similar to the discussion of computing devices 104, the access system 112 and the channel preference score generation system 116 can each be implemented by one or more of any of a variety of different types of devices, ranging from full resource devices with substantial memory and processor resources to low-resource devices with limited memory and/or processing resources The access system 112 stores in the access log 114 event data. An event refers to selection of A/V content for playback, and each time an event occurs, event data for that event is recorded in the access log 114. The event data can be any of a variety of different information describing when the event occurred and/or what the event is (e.g., various information regarding the selection of A/V content).

Table I illustrates an example of the event data recorded for each event. It should be noted that Table I is an example of the event data, and that not all of the event data discussed in Table I may be recorded for an event and/or additional information not described in Table I may be recorded for an event.

TABLE I

| Data | Description |
| --- | --- |
| Day | The day of the week on which the event occurred. |
| Time | The time of the day at which the event occurred. |
| Device | A type of computing device being used to play back the selected A/V content (e.g., television, desktop PC, mobile phone, etc.). |
| Operating system | The name (and optionally version) of the operating system running on the device used to play back the selected A/V content. |
| Provider | The provider (e.g., the content source) of the selected A/V content. |
| Channel watched | The channel from which the A/V content was selected. |
| Identifier | An identifier of the user that made the selection (e.g., a user id or screen name of the user). |
| Security token | A token provided by the content source in response to the selection of the A/V content. The token indicates whether the user is authorized (e.g., as determined by the content source) to playback the A/V content on a particular device. |

Figure 3:
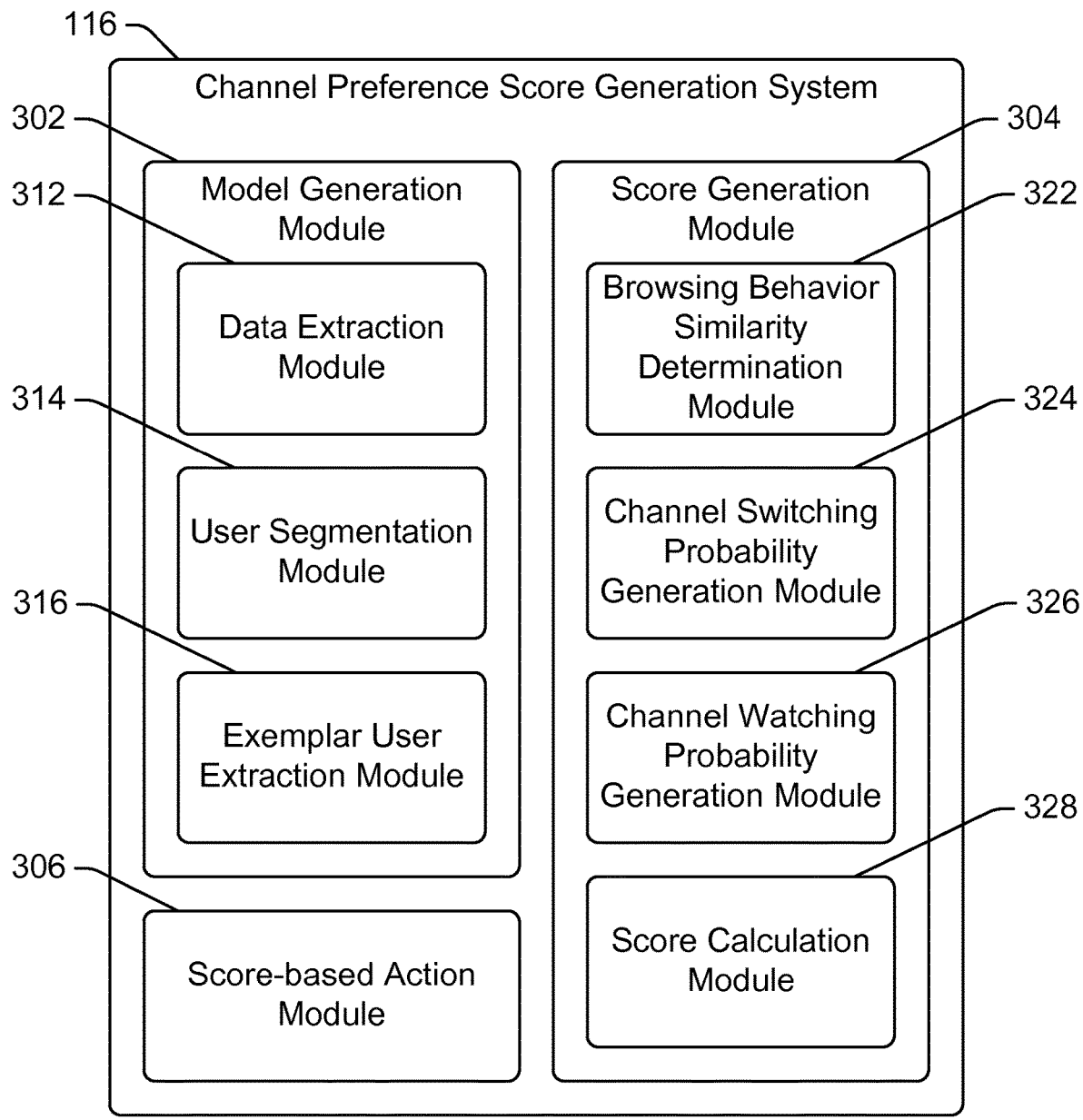
FIG. 3 is a block diagram illustrating an example channel preference score generation system in accordance with one or more embodiments.

FIG. 3 is a block diagram illustrating an example channel preference score generation system 116 in accordance with one or more embodiments. The channel preference score generation system 116 includes a model generation module 302, a score generation module 304, and optionally a score-based action module 306. The model generation module 302 generates a data model describing the event data in the access log 114, and the score generation module 304 generates channel preference scores for users based on the generated data model. The score-based action module 306 takes one or more actions based on the generated channel preference scores, such as presenting recommended channels to the user, providing promotional materials to the user with different promotional materials being provided based on the channel preference scores, and so forth. Although illustrated as part of the same channel preference score generation system 116, the model generation module 302, the score generation module 304, and/or the score-based action module 306 can alternatively be implemented by separate systems.

The model generation module 302 includes a data extraction module 312, a user segmentation module 314, and an exemplar user extraction module 316. The data extraction module 312 extracts various data from the access log 114 regarding a user. The extracted data includes the event data for the user for one or more events, such as information describing when an event occurred, various information regarding the selection of A/V content, and so forth. The extracted data also includes information describing sequential events referred to as "sessions," which will be discussed in more detail below.

The data extraction module 312 communicates the extracted data to the user segmentation module 314. The user segmentation module 314 groups each of the users into one or more segments based on channel switching probabilities for the user. For each channel pair, there is a segment corresponding to switching from one channel in the channel pair to the other channel in the channel pair. For each pair of channels that the extracted data indicates the user watched, the user is grouped into the segment corresponding to the channel switch that the user is determined to have a higher probability of making. For example, for two channels $CH_i$ and $CH_k$, if the user has a higher probability of switching from channel $CH_i$ to channel $CH_k$ than from channel $CH_k$ to channel $CH_i$, then the user is grouped in the segment of users that switched from channel $CH_i$ to channel $CH_k$. However, if the user is determined to have a higher probability of switching from channel $CH_k$ to channel $CH_i$ than from channel $CH_i$ to channel $CH_k$, then the user is grouped in the segment of users that switched from channel $CH_k$ to channel $CH_i$. This grouping of users into segments will be discussed in more detail below.

The user segmentation module 314 communicates to the exemplar user extraction module 316 an indication of which users have been grouped into which segments. The exemplar user extraction module 316 identifies, for each segment, a particular number of users that are deemed by the user extraction module 316 to be representative of the segment. Generally, given the browsing behavior features as inputs for the users in the segment, the exemplar user extraction module 316 uses a clustering algorithm to identify a particular number of users that represent collections or clusters of users having the same or similar browsing behavior features. These particular users are referred to as exemplar users for the segment. These exemplar users are used by the score generation module 304, as will be discussed in more detail below. The model generation module 302 communicates an indication of these exemplar users to the score generation module 304. This indication can take various forms, such as a list or other record (e.g., data structure) including identifiers of the exemplar users, pointers to or other records of locations in a memory device or storage device where identifiers of the exemplar users are stored, and so forth.

The score generation module 304 includes a browsing behavior similarity determination module 322, a channel switching probability generation module 324, a channel watching probability generation module 326, and a score calculation module 328. The browsing behavior similarity determination module 322 determines the similarity of a user's browsing behavior to the browsing behavior of the exemplar users in the different segments, and communicates an indication of the determined similarity to the score calculation module 328.

The channel switching probability generation module 324 determines the probabilities of users switching from one channel to another. The channel switching probability generation module 324 makes this determination for all users (or at least a threshold number of users) for which event data is collected. The channel switching probability generation module 324 then communicates an indication of the determined probabilities for these users to the score calculation module 328.

The channel watching probability generation module 326 determines for a user, for each of one or more channels, the probability of the user watching the channel based on their past channel viewing behavior. The channel watching probability generation module 326 then communicates an indication of those determined probabilities to the score calculation module 328. The score calculation module 328 calculates a channel preference score for a user for a channel based on the indication of the determined similarity received from the browsing behavior similarity determination module 322, the indication of the determined probabilities received from the channel switching probability generation module 324, and the indication of the determined probabilities received from the channel watching probability generation module 326.

Figure 4:
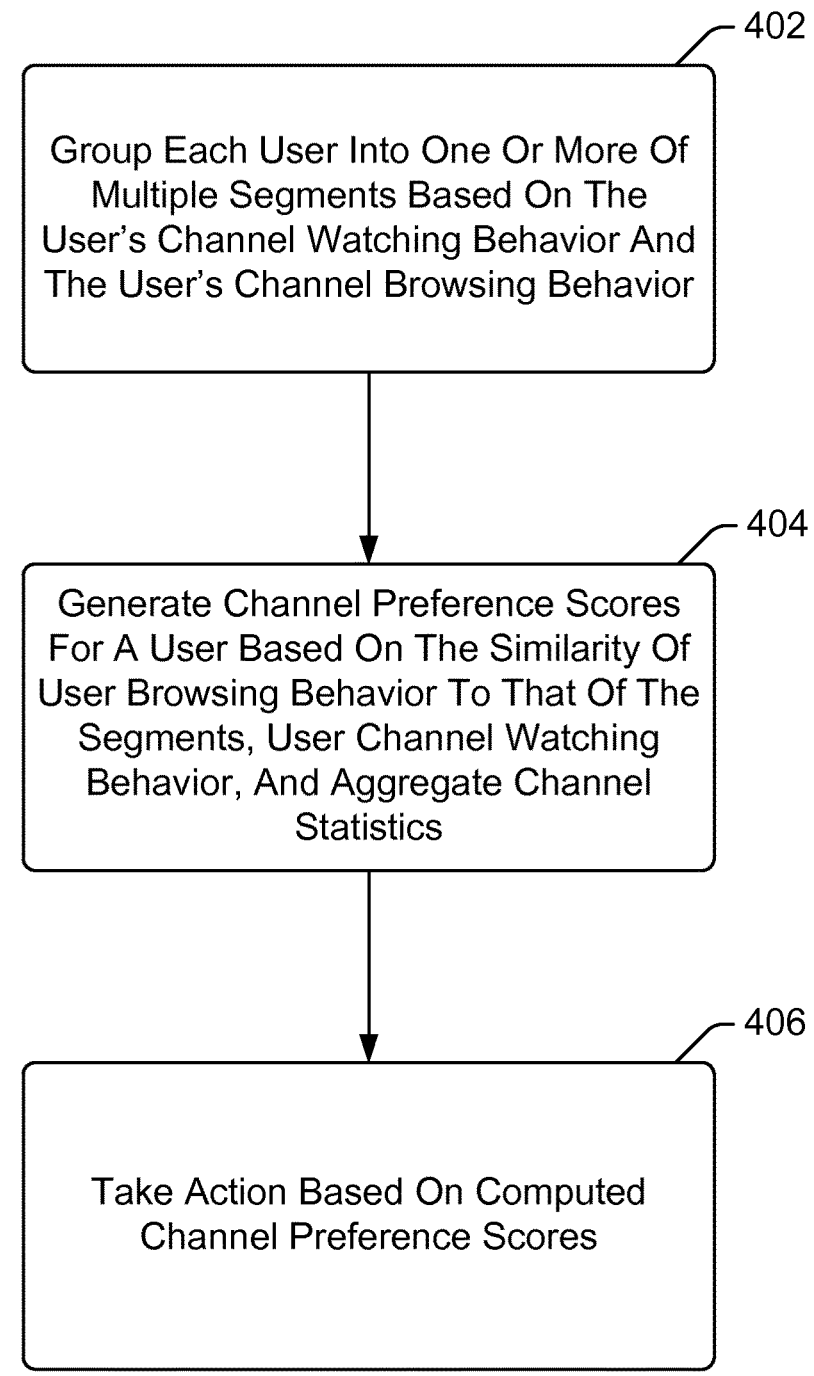
FIG. 4 is a flowchart illustrating an example process for implementing the channel preference scoring for users in accordance with one or more embodiments.

FIG. 4 is a flowchart illustrating an example process 400 for implementing the channel preference scoring for users in accordance with one or more embodiments. Process 400 is carried out by a device, such as a device implementing the channel preference score generation system 116, and can be implemented in software, firmware, hardware, or combinations thereof. Process 400 is shown as a set of acts and is not limited to the order shown for performing the operations of the various acts. Process 400 is an example process for implementing the channel preference scoring for users; additional discussions of implementing the channel preference scoring for users are included herein with reference to different figures.

In process 400, each user is grouped into one or more of multiple segments based on the user's channel watching behavior and the user's channel browsing behavior (act 402). The channel watching behavior refers to which channels the user watches, as discussed above. The browsing behavior refers to features describing the user's behavior when watching A/V content provided by a channel, as discussed above. The grouping is performed over a time period, such as one month.

Channel preference scores are generated for a user based on the similarity of user browsing behavior to that of users in the segments, user channel watching behavior, and aggregate channel statistics (act 404). As discussed in more detail below with reference to FIG. 6, the user channel watching behavior and the aggregate channel statistics are used to generate the channel preference scores for the user by determining the probabilities of the user watching each of multiple channels and the probabilities of users switching from one channel to another.

One or more actions are then taken based on the computed channel preference scores (act 406). Various different actions can be taken based on the computed channel preference scores, such as presenting recommended channels to the user (e.g., those channels having higher or larger channel preference scores), providing promotional materials to the user with different promotional materials being provided based on the channel preference scores, and so forth.

Figure 5:
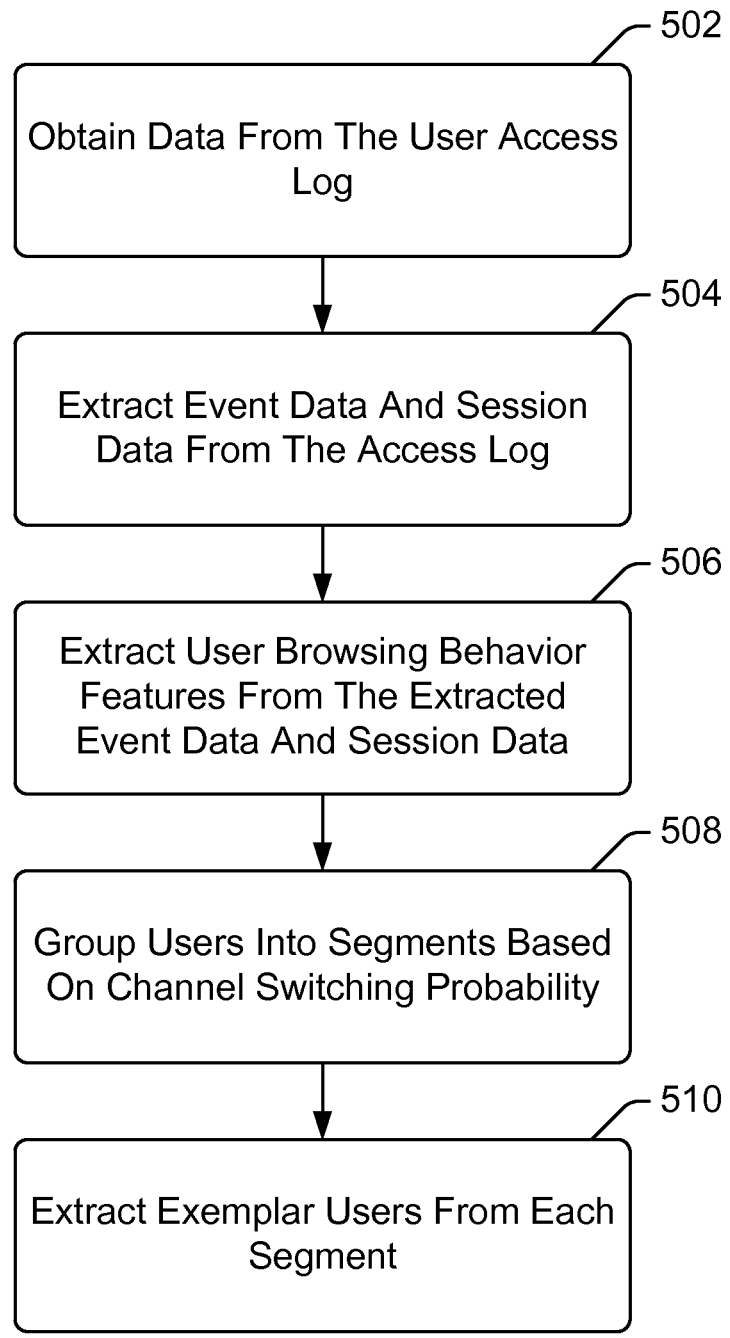
FIG. 5 is a flowchart illustrating an example process for generating a data model describing the event data in the access log in accordance with one or more embodiments.

FIG. 5 is a flowchart illustrating an example process 500 for generating a data model describing the event data in the access log in accordance with one or more embodiments. Process 500 is carried out by a device, such as a device implementing the channel preference score generation system 116, and can be implemented in software, firmware, hardware, or combinations thereof. In one or more embodiments, process 500 is carried out by the model generation module 302 of FIG. 3. Process 500 is shown as a set of acts and is not limited to the order shown for performing the operations of the various acts. Process 500 is an example process for generating a data model describing the event data in the access log; additional discussions of generating a data model describing the event data in the access log are included herein with reference to different figures.

In process 500, data from the user access log is obtained (act 502). The user access log includes the event data, as discussed above.

Event data and session data are extracted from the access log for each user (act 504) or at least a threshold number of users. These users are the users of the system 100 of FIG. 1 (the users that watch A/V content). The event data refers to the event data recorded for a user each time an event occurs as discussed above. All event data for a user can be extracted from the access log, or alternatively only some of the event data for a user can be extracted from the access log (e.g., event data for a particular time range, such as for the preceding month).

Session data is extracted based on the event data stored in the access log 114 for the various events that occurred. A session refers to sequential events that begin with one event and end in response to one of two things occurring: 1) a given time period (e.g., one hour) elapsing with no new events occurring, or 2) particular event data changing (e.g., a new event occurs having different particular event data than the previous event). In one or more embodiments, the changes to particular event data that can cause a session to end include a change in the channel being watched, a change of the device being used to watch the channel, a change of the provider of the A/V content being watched, or a change of the operating system being used to watch the channel.

Thus, a session ends each time the given time period elapses with no new events occurring, or the particular event data changes. After the session ends, a new session is created, either beginning with the event that caused the previous session to end (if the previous session ended due to a change in the particular event data) or beginning when the next event is received. For example, each channel change by the user results in a new session. By way of another example, a session begins with user selection of particular A/V content and if the user watches that A/V content for more than the given time period (e.g., one hour) without making any other selections of A/V content, then that session will end after the given time period (e.g., one hour) elapses, and a new session will be created in response to the next user selection of A/V content.

Alternatively, rather than generating the session data based on the extracted event data in act 504, the session data can be generated (e.g., by the access system 112) at other times. For example, the session data can be generated and stored in the access log 114 as the event data is stored in the access log 114.

User browsing behavior features are extracted for each user from the extracted event data and session data (act 506). Generally, the browsing behavior features describe the behavior of the user when watching A/V content and/or selecting A/V content for watching. Various different statistics can be extracted and used as the browsing behavior features.

Table II illustrates an example of the browsing behavior features extracted in act 506. It should be noted that Table II is an example of the browsing behavior features, and that not all of the features discussed in Table II may be extracted and/or additional browsing behavior features not described in Table II may be extracted.

TABLE II

| Feature | Description |
| --- | --- |
| Session number | The total number of sessions extracted for the user. |
| Session duration | The durations of the sessions extracted for the user. Can be the durations of each session, or a value based on those durations (e.g., the mean of the durations). |
| Inter-session time | The times between session for the user (e.g., the time difference between start times of consecutive sessions). Can be the times between each consecutive session, or a value based on those times (e.g., the mean of the times between each consecutive session). |
| Token request statistics | Statistics regarding security token requests within a session for the user. Security tokens can have a lifetime before they expire, and a new security is requested each time A/V content is selected and no currently valid (non-expired) security token is available to the playback module. These statistics can include, for example, the number of token requests and/or the times between token requests (the times between each token request, or a value based on those times (e.g., the mean of the times between token requests)). |
| Session time statistics | The day and time of each session for the user, such as the day and time of the start of each session, the day and time of the end of each session, or the day and time duration of each session. |

The users are grouped into segments based on channel switching probabilities (act 508). Each user can be grouped into one or more segments based on the channel switching probabilities of the user for the time period (e.g., one month) for which data was obtained from the user access log.

For each channel, there is a segment of users who watched only that channel over the time period. Users who only watched one particular channel over the time period are grouped into the segment for that particular channel.

Additionally, for each channel pair, there is a segment corresponding to switching from one channel in the channel pair to another channel in the channel pair. For example, assume there are a total of C channels $CH_i$ with i=1, . . . , C. For each channel pair $CH_i$ and $CH_k$, where i≠k, there is a segment corresponding to ($CH_i$, $CH_k$) for users who switched from channel $CH_i$ to channel $CH_k$ more frequently than from channel $CH_k$ to channel $CH_i$, and a segment corresponding to ($CH_k$, $CH_i$) for users who switched from channel $CH_k$ to channel $CH_i$ more frequently than from channel $CH_i$ to channel $CH_k$.

For each user that has watched the channel pair $CH_i$ and $CH_k$ over the time period, a probability of the user switching from channel $CH_i$ to channel $CH_k$ is determined, and a probability of the user switching from channel $CH_k$ to channel $CH_i$ is determined. The user is assigned to a segment based on those probabilities. For example, if user A watched both channel $CH_i$ and channel $CH_k$, but switched from channel $CH_i$ to channel $CH_k$ more frequently than from channel $CH_k$ to channel $CH_i$, then user A is in the segment ($CH_i$, $CH_k$). However, if user B watched both channel $CH_i$ and channel $CH_k$, but switched from channel $CH_k$ to channel $CH_i$ more frequently than from channel $CH_i$ to channel $CH_k$, then user B is in the segment ($CH_k$, $CH_i$).

This can also be referred to mathematically as follows. For each distinct channel pair $CH_i$ and $CH_k$, where i≠k, the following probabilities are calculated:

$$P_{User}(Ch_i \mid Ch_k) = \frac{\text{No. of } Ch_k \text{ sessions immediately succeeded by } Ch_i \text{ for User}}{\text{Total No. of } Ch_k \text{ and } Ch_i \text{ sessions for User}}$$

$$P_{User}(Ch_k \mid Ch_i) = \frac{\text{No. of } Ch_i \text{ sessions immediately succeeded by } Ch_k \text{ for User}}{\text{Total No. of } Ch_k \text{ and } Ch_i \text{ sessions for User}}$$

where $P_{User}(Ch_i|Ch_k)$ is the probability of User switching from channel $CH_i$ to channel $CH_k$, $P_{User}(Ch_k|Ch_i)$ is the probability of User switching from channel $CH_k$ to channel $CH_i$, "No. of $Ch_k$ sessions immediately succeeded by $Ch_i$ for User" refers to the number of sessions for User in which channel $CH_k$ was watched and immediately succeeded by watching of channel $CH_i$ (the user switched from channel $CH_k$ to channel $CH_i$), "No. of $Ch_i$ sessions immediately succeeded by $Ch_k$ for User" refers to the number of sessions for User in which channel $CH_i$ was watched and immediately succeeded by watching of channel $CH_k$ (the user switched from channel $CH_i$ to channel $CH_k$), and "Total No. of $Ch_k$ and $Ch_i$ sessions for User" refers to the total number of sessions for User in which either channel $CH_i$ was watched or channel $CH_k$ was watched.

For each distinct channel pair $CH_i$ and $CH_k$, where i≠k, that the user has watched, the user is grouped into segment ($CH_i$, $CH_k$) or segment ($CH_k$, $CH_i$). If $P_{User}(Ch_i|Ch_k)$ is greater than $P_{User}(Ch_k|Ch_i)$, then the user is grouped into segment ($CH_i$, $CH_k$). However, if $P_{User}(Ch_k|Ch_i)$ is greater than $P_{User}(Ch_i|Ch_k)$, then the user is grouped into segment ($CH_k$, $CH_i$).

It should be noted that a user can be grouped into multiple segments.

Exemplar users are extracted from each segment (act 510). An exemplar user of a segment refers to a user that is deemed to be representative of the segment. In one or more embodiments, a clustering technique (e.g., a clustering algorithm) is used on each segment with the browsing behavior features of the users in that segment being the input to the clustering algorithm. Generally, given the browsing behavior features as inputs for the users in the segment, the clustering algorithm identifies a particular number of users that represent collections or clusters of users having the same or similar browsing behavior features. These identified users may also be referred to as the centers of the clusters. In one or more embodiments, the particular number of users identified is 50, although other numbers of users can alternatively be identified. Any of a variety of different clustering algorithms can be used, such as a k-medoid algorithm a k-means algorithm, a distribution-based algorithm, a density-based algorithm, and so forth. The users identified as representing the collections or clusters of users by the clustering algorithm for each segment are the exemplar users for that segment.

Figure 6:
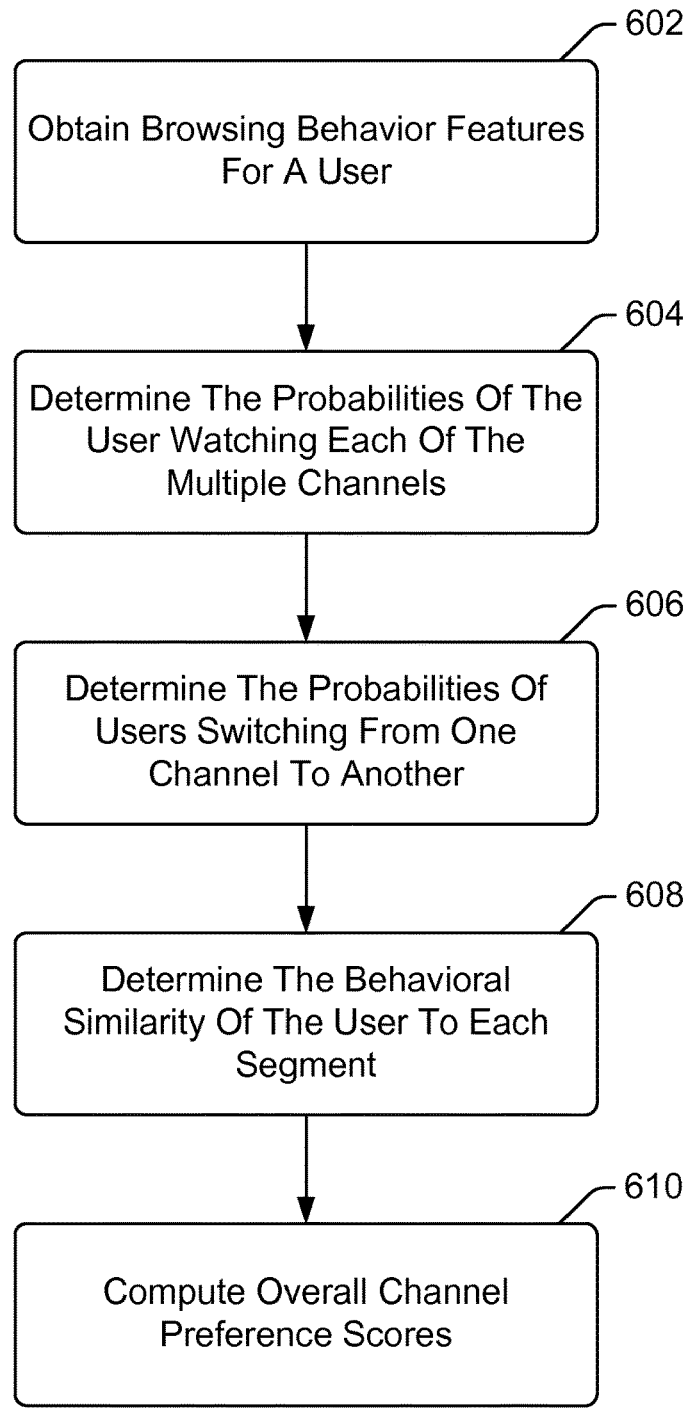
FIG. 6 is a flowchart illustrating an example process for generating channel preference scores for a user in accordance with one or more embodiments.

FIG. 6 is a flowchart illustrating an example process 600 for generating channel preference scores for a user in accordance with one or more embodiments. Process 600 is carried out by a device, such as a device implementing the channel preference score generation system 116, and can be implemented in software, firmware, hardware, or combinations thereof. In one or more embodiments, process 600 is carried out by the score generation module 304 of FIG. 3. Process 600 is shown as a set of acts and is not limited to the order shown for performing the operations of the various acts. Process 600 is an example process for generating channel preference scores for a user; additional discussions of generating channel preference scores for a user are included herein with reference to different figures.

In process 600, browsing behavior features for the user are obtained (act 602). These browsing behavior features can be extracted from the extracted event data and session data analogous to the discussion above in act 506 of FIG. 5, and various different browsing behavior features can be extracted. Alternatively, if the browsing behavior features have already been extracted in act 506 of FIG. 5 and are still accessible, then the browsing behavior features for a user in act 602 can be obtained by copying or otherwise accessing those previously extracted browsing behavior features for the user.

The probabilities of the user watching each of the multiple channels is determined (act 604). These probabilities are based on the channels that the user actually watched, and are included as part of the user channel watching behavior discussed above. In one or more embodiments, for each of the multiple channels, the probability of the user watching the channel is determined as follows:

$$P_{User}(Ch_k) = \frac{\text{No. of sessions of User watching channel } Ch_k}{\text{Total sessions of the User}}$$

where $P_{User}(Ch_k)$ is the probability of User watching channel $CH_k$, "No. of sessions of User watching channel $Ch_k$" refers to the number of sessions in which channel $CH_k$ was watched, and "Total sessions of the User" refers to the total number of sessions for the user (regardless of which channels were watched during those sessions).

The probabilities of users switching from one channel to another are also determined (act 606). In one or more embodiments, the probabilities determined in act 606 include, for each channel pair including a first channel and a second channel, the probability of the users switching from the first channel to the second channel, and the probability of the users switching from the second channel to the first channel. The probabilities are determined in act 606 for all (or at least a threshold number) of the users. These probabilities are based on the channel switching behavior of all (or at least a threshold number) of users, and are included as part of the user channel watching behavior discussed above. These probabilities are also included as part of the aggregate channel statistics discussed above due to the probabilities being determined across all (or at least a threshold number) of users rather than a single user.

In one or more embodiments, the probability of users switching from one channel to another is determined as follows:

$$P_{Sw}(Ch_i \mid Ch_k) = \frac{\text{No. of } Ch_k \text{ sessions immediately succeeded by } Ch_i \text{ session}}{\text{Total No. of } Ch_k \text{ sessions of all users}}$$

where $P_{Sw}(Ch_i|Ch_k)$ is the probability of users switching from channel $CH_i$ to channel $CH_k$, "No. of $Ch_k$ sessions immediately succeeded by $Ch_i$ session" refers to the number of sessions for users in which channel $CH_k$ was watched and immediately succeeded by watching of channel $CH_i$ (the user switched from channel $CH_k$ to channel $CH_i$), and "Total No. of $Ch_k$ sessions of all the users" refers to the total number of sessions for all the users (or at least a threshold number of users) in which channel $CH_k$ was watched.

The behavioral similarity of the user to each of the multiple segments is also determined (act 608). This determination is made based on the exemplar users extracted for each segment as discussed above (e.g., in act 510 of FIG. 6). Generally, based on the browsing behavior features of the user and the exemplar users in each segment, an indication of how similar the user is to the exemplar users is determined. These indications are the similarity of user browsing behavior to that of the segments discussed above.

In one or more embodiments, for each segment, the similarity of the user to the exemplar users in the segment is determined as follows:

$$Sim(User, Ex(Ch_k, Ch_i)) = e^{-\alpha * dist^2}$$

where $Sim(User, Ex(Ch_k, Ch_i))$ is the similarity of User to the exemplar users in the segment corresponding to switching from channel $CH_k$ to channel $CH_i$, e refers to the natural logarithm (also referred to as Euler's number), dist refers to the distance between the browsing behavior features of User and the browsing behavior features of at least one of the exemplar users in the segment corresponding to switching from channel $CH_k$ to channel $CH_i$, and a refers to a weight factor. The value of a can be set by the developer or user of the system as desired to increase or decrease the amount that the similarity of the user to the exemplar users in the segment corresponding to switching from channel $CH_k$ to channel $CH_i$ affect the overall channel preference score. In one or more embodiments, the value of $\alpha$ is between 0 and 1, although other values can alternatively be used. The higher the similarity score $Sim(User, Ex(Ch_k, Ch_i))$, the more similar the user's browsing behavior is to users who have switched to channel $CH_i$ from channel $CH_k$.

The distance dist is the minimum distance between the browsing behavior features of the user and any of the exemplar users in the segment. The distance dist is thus the distance to the one exemplar user in the segment that is closest to the user (based on their browsing behavior features). In one or more embodiments, the distance dist determined as follows:

$$dist = \min_{Ex_j \in Ex(Ch_k, Ch_i)} distance(BF(User), BF(Ex_j))$$

where $Ex_j$ is one of the exemplar users in the segment corresponding to switching from channel $CH_k$ to channel $CH_i$, distance refers to a vector distance measure, BF (User) refers to the browsing behavior features of User, and $BF(Ex_j)$ refers to the browsing behavior features of the exemplar user $Ex_j$. Any of a variety of different vector distance measures can be used, such as the 1-2 distance measure, the 1-1 or Manhattan distance, a histogram distance or a cosine similarity, and so forth.

It should be noted that in the determination of behavioral similarity in act 608, the channel $CH_k$ to channel $CH_i$ can be the same channel (in other words, i=k), in which case the segment corresponds to users who watch only that particular channel (channel $CH_k$, which is the same as channel $CH_i$).

The overall channel preference scores are then generated (act 610). The channel preference score for a channel is generated based on the probabilities of the user watching each of the multiple channels as determined in act 604, the probabilities of users switching from one channel to another as determined in act 606, and the behavioral similarity of the user to each segment as determined in act 608. In one or more embodiments, the overall channel preference score (also referred to as simply the channel preference score) for User for each channel $CH_i$ with i=1, . . . , C is determined as follows:

$$Sim(Ch_i, User) = \sum_{k=1,\ldots,C} P_{User}(Ch_k) P_{Sw}(Ch_i | Ch_k) Sim(User, Ex(Ch_k, Ch_i))$$

where $Sim(Ch_i, User)$ is the overall channel preference score for User for channel $CH_i$, $P_{User}(Ch_k)$ is the probability of User watching channel $CH_k$ as discussed above, $P_{Sw}(Ch_i|Ch_k)$ is the probability of users switching from channel $CH_i$ to channel $CH_k$ as discussed above, and $Sim(User, Ex(Ch_k, Ch_i))$ is the similarity of User to the exemplar users in the segment corresponding to switching from channel $CH_k$ to channel $CH_i$ as discussed above.

It should be noted that, from the discussions above, it can be seen that the channel preference scores for a particular user are generated based on the information in the access log 114 of FIG. 1. Personally identifiable information (PII) regarding the user need not be tracked, preserving the user's privacy. Although the event data may include an identifier of the user that made the selection as discussed above, this identifier can simply serve to distinguish different users from each other, and no information identifying who that particular user is needs to be tracked using the techniques discussed herein.

The techniques discussed herein support various different usage scenarios. Channel preference scores for a user can be generated and used to recommend channels of A/V content to users, to promote products or services to users, and so forth. This can help both the content sources keep users engaged in their channels, and can provide users with an easier way to watch A/V content that is of interest to them.

Returning to FIG. 3, in one or more embodiments the score-based action module 306 takes one or more actions based on the generated channel preference scores. In one or more embodiments, the action taken by the score-based action module 306 is an action to promote or recommend one or more channels to a user. The one or more channels that are promoted or recommended are those having a channel preference score for the user that exceeds a threshold value. The action refers to communication of a promotion or recommendation to the user's computing device. The communication can be made in a variety of different manners, such as by electronic mail, as streaming A/V content, as display of a graphic image (and/or playback of an audio sound clip) representing the channel, and so forth. For example, the action can be communicating a fifteen second A/V clip that shows examples of the types of A/V content available from a particular channel.

The score-based action module 306 can itself communicate the promotions or recommendations to the user's computing device, or alternatively can provide an indication to another device or system (e.g., a content source 102) to provide the promotion or recommendation to the user's computing device. The promotion or recommendation can then be presented to the user, such as the display of an electronic mail message, playback of A/V content (e.g., a trailer or other promotion for a channel), and so forth.

The score-based action module 306 can further store records (e.g., at the channel preference score generation system 116) regarding which promotions or recommendations having been communicated to which users. This allows the score-based action module 306 to avoid undesired duplicating of promotion or recommendation communications to the users.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
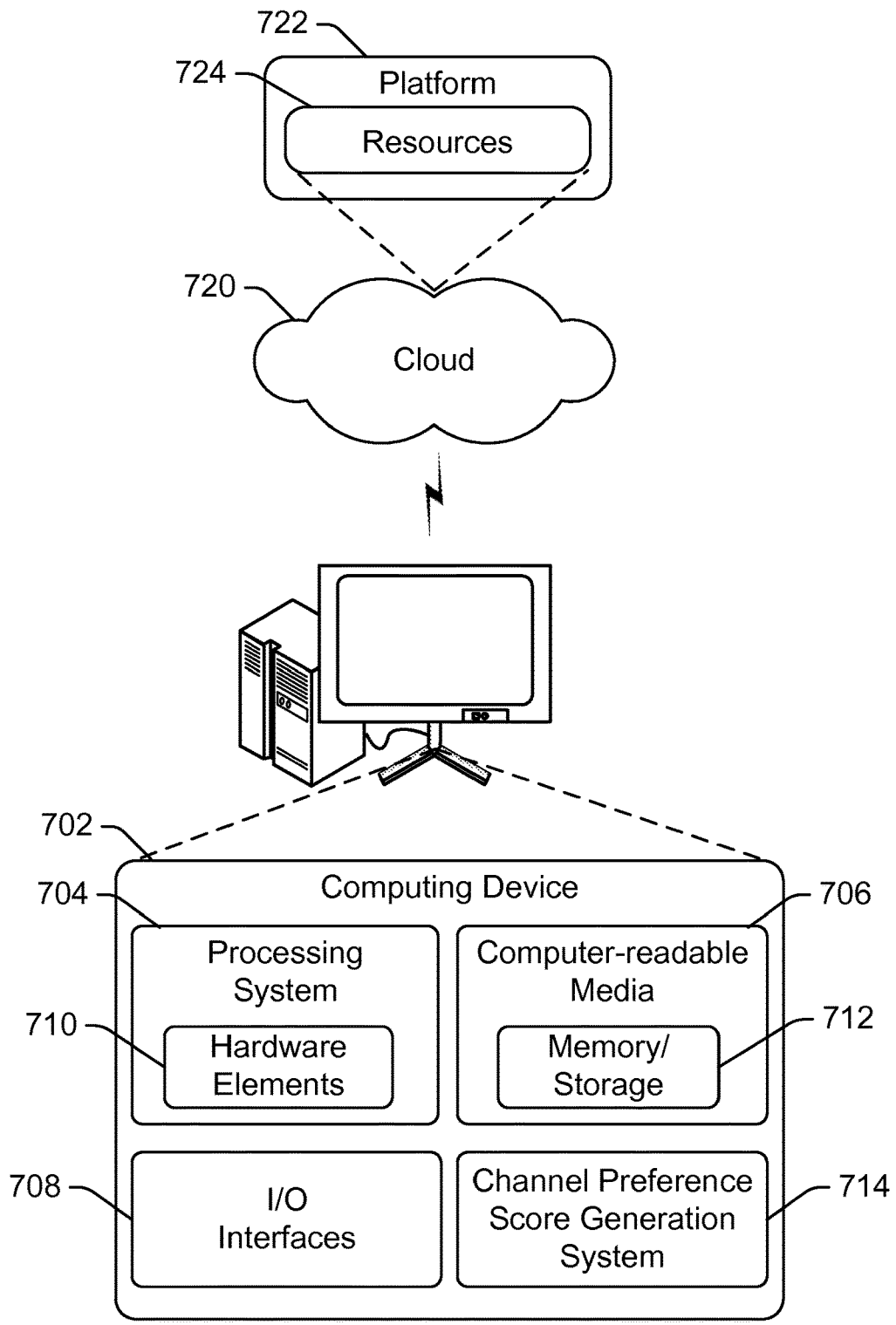
FIG. 7 illustrates an example system that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. This is illustrated through inclusion of the channel preference score generation system 714, which may be configured to generate channel preference scores for users as discussed herein. Computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 704 is representative of functionality to perform one or more operations using hardware. Accordingly, processing system 704 is illustrated as including hardware elements 710 that may be configured as processors, functional blocks, and so forth. This may include implementation in hardware as an application specific integrated circuit or other logic device formed using one or more semiconductors. Hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 706 is illustrated as including memory/storage 712. Memory/storage 712 represents memory/storage capacity associated with one or more computer-readable media. Memory/storage component 712 may include volatile media (such as random access memory (RAM)) and/or nonvolatile media (such as read only memory (ROM), Flash memory, optical disks, magnetic disks, and so forth). Memory/storage component 712 may include fixed media (e.g., RAM, ROM, a fixed hard drive, and so on) as well as removable media (e.g., Flash memory, a removable hard drive, an optical disc, and so forth). Computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 702. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. Computing device 702 may be configured to implement particular instructions and/or functions corresponding to the software and/or hardware modules. Accordingly, implementation of a module that is executable by computing device 702 as software may be achieved at least partially in hardware, e.g., through use of computer-readable storage media and/or hardware elements 710 of processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of computing device 702 and are not limited to the specific examples of the techniques described herein. This functionality may also be implemented all or in part through use of a distributed system, such as over a "cloud" 720 via a platform 722 as described below.

Cloud 720 includes and/or is representative of a platform 722 for resources 724. Platform 722 abstracts underlying functionality of hardware (e.g., servers) and software resources of cloud 720. Resources 724 may include applications and/or data that can be utilized while computer processing is executed on servers that are remote from computing device 702. Resources 724 can also include services provided over the Internet and/or through a subscriber network, such as a cellular or Wi-Fi network.

Platform 722 may abstract resources and functions to connect computing device 702 with other computing devices. Platform 722 may also serve to abstract scaling of resources to provide a corresponding level of scale to encountered demand for resources 724 that are implemented via platform 722. Accordingly, in an interconnected device embodiment, implementation of functionality described herein may be distributed throughout system 700. For example, the functionality may be implemented in part on computing device 702 as well as via platform 722 that abstracts the functionality of the cloud 720.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   generating a plurality of channel pairs from a plurality of channels available via an audio/video (A/V) content playback system;
   generating a plurality of user segments, in which each user segment of the plurality of user segments describes switching behavior from one said channel to another said channel in a respective channel pair of the plurality of channel pairs;
   grouping users of the A/V content playback system into respective user segments of the plurality of user segments based on switching from the one said channel to the other said channel in the respective channel pair;
   generating channel preference scores for the plurality of channels in the A/V content playback system for a subsequent user based on similarity of a switching behavior of the subsequent user to the switching behavior of at least one user segment of the plurality of user segments; and
   recommending at least one channel from the plurality of channels to the subsequent user based on the channel preference scores.

2. The method as recited in claim 1, further comprising obtaining, from an access log, event data that includes the channel switching behavior.

3. The method as recited in claim 1, wherein for each said user watching a first channel of the plurality of channels of A/V content and a second channel of the plurality of channels of A/V content, the grouping comprises:
   grouping the user in a first user segment of the plurality of user segments corresponding to switching from the first channel to the second channel in response to the user switching from the first channel to the second channel more frequently than from the second channel to the first channel, and
   grouping the user in a second user segment of the plurality of user segments corresponding to switching from the second channel to the first channel in response to the user switching from the second channel to the first channel more frequently than from the first channel to the second channel.

4. The method as recited in claim 1, further comprising extracting, for each of the plurality of user segments, a set of exemplar users that are representative of each user segment, the extracting including applying a clustering technique to the users grouped in the user segment.

5. The method as recited in claim 1, wherein generating the channel preference scores includes:
   determining probabilities of the subsequent user watching each of the plurality of channels of A/V content;
   determining the probabilities of the users switching from one channel to another in the system; and
   determining a behavioral similarity of the subsequent user to each of the plurality of user segments.

6. The method as recited in claim 5, further comprising:
identifying one or more sessions for the subsequent user based at least in part on ones of the plurality of channels watched by the subsequent user, each said session including data regarding the watching of a channel of the plurality of channels by the subsequent user; and
determining probabilities of the subsequent user watching each of the plurality of channels of A/V content by, for each of the plurality of channels, dividing a number of sessions during a time period in which the channel was watched by a total number of sessions for the subsequent user during the time period.

7. The method as recited in claim 5, further comprising:
identifying one or more sessions for each said user based at least in part on ones of the plurality of channels watched by the each said user, each said session including data regarding the watching of a channel of the plurality of channels by one of the users; and
determining the probabilities of the users switching from one channel to another in the A/V system by, for each channel pair including a first said channel and a second said channel, dividing a number of sessions during a time period in which the second said channel was watched immediately succeeding the first said channel being watched by a total number of sessions that the second said channel was watched by any of the users during the time period.

8. The method as recited in claim 5, further comprising determining the behavioral similarity of the subsequent user to each of the plurality of user segments by determining, for each of the plurality of user segments, a distance between browsing behavior features of the subsequent user and browsing behavior features of at least one exemplar user of a respective said user segment.

9. A system implemented in one or more computing devices to generate channel preference scores, the system comprising:
one or more processors; and
one or more computer-readable media embodying instructions which, when executed, implement modules comprising:
a model generation module configured to:
generate a plurality of channel pairs from a plurality of channels available via an audio/video (A/V) content playback system;
generate a plurality of user segments, in which each user segment of the plurality of user segments describes switching behavior from one said channel to another said channel in a respective channel pair of the plurality of channel pairs;
group users of the A/V content playback system into respective user segments of the plurality of user segments based on switching from the one said channel to the other said channel in the respective channel pair;
communicate an indication of channel switching behavior features of users grouped into the plurality of user segments to a score generation module; and
the score generation module configured to generate a channel preference score for each of the plurality of channels in the A/V content playback system, for a subsequent user based on similarity of switching behavior of the subsequent user to switching behavior of at least one user segment from the plurality of user segments.

10. The system as recited in claim 9, the system further comprising: an access log that includes event data for the subsequent user, the event data comprising the channel switching behavior of the subsequent user.

11. The system as recited in claim 9, wherein for each user watching a first channel of the plurality of channels and a second channel of the plurality of channels, the model generation module is configured to:
group the user in a first user segment of the plurality of user segments corresponding to switching from the first channel to the second channel in response to the user switching from the first channel to the second channel more frequently than from the second channel to the first channel, and
group the user in a second user segment of the plurality of user segments corresponding to switching from the second channel to the first channel in response to the user switching from the second channel to the first channel more frequently than from the first channel to the second channel.

12. The system as recited in claim 9, the model generation module being further configured to extract, for each of the plurality of user segments, a set of exemplar users that are representative of the user segment, the extraction including applying a clustering technique to the users grouped in the user segment.

13. The system as recited in claim 9, wherein the score generation module is further configured to generate the channel preference score for the subsequent user by:
determining probabilities of the subsequent user watching each of the plurality of channels;
determining the probabilities of the users switching from one channel to another; and
determining a behavioral similarity of the subsequent user to the plurality of user segments.

14. The system as recited in claim 13, the model generation module being further configured to identify one or more sessions for the subsequent user based at least in part on ones of the plurality of channels watched by the subsequent user, each said session including data regarding the watching of a channel by the subsequent user, and
the score generation module being further configured to determine the probabilities of the subsequent user watching each of the plurality of channels by, for each of the plurality of channels, dividing a number of said sessions during a time period in which the channel was watched by a total number of said sessions for the subsequent user during the time period.

15. The system as recited in claim 13, the model generation module being further configured to identify one or more sessions for each of the users based at least in part on ones of the plurality of channels watched by each of the users, each said session including data regarding the watching of a channel of the plurality of channels by one of the users, and
the score generation module being further configured to determine probabilities of the users switching from one said channel to another by, for each said channel pair including a first channel and a second channel, dividing a number of said sessions during a time period in which the second channel was watched immediately succeeding the first channel being watched by a total number of sessions that the second channel was watched by any of the users during the time period.

16. The system as recited in claim 13, the score generation module being further configured to determine the behavioral similarity of the subsequent user to each of the plurality of user segments by determining, for each of the plurality of user segments, a distance between browsing behavior features of the subsequent user and browsing behavior features of at least one exemplar user of the user segment.

17. One or more computing devices comprising:
   one or more processors; and
   one or more computer-readable storage media having stored thereon multiple instructions that, responsive to execution by the one or more processors, cause the one or more processors to perform acts comprising:
      generating a plurality of channel pairs from a plurality of channels available via an audio/video (A/V) content playback system;
      generating a plurality of user segments, in which each user segment of the plurality of user segments describes switching behavior from one said channel to another said channel in a respective channel pair of the plurality of channel pairs;
      grouping users of the A/V content playback system into respective user segments of the plurality of user segments based on switching from the one said channel to the other said channel in the respective channel pair;
      generating for each of the plurality of channels in the A/V content playback system, a channel preference score for a subsequent user based on similarity of switching behavior of the subsequent user to switching behavior of at least one user segment from the plurality of user segments; and
      taking an action to recommend at least one channel from the plurality of channels to the subsequent user based on the generated channel preference scores.

18. The one or more computing devices as recited in claim 17, wherein the acts further comprise extracting, for each of the plurality of user segments, a set of exemplar users that are representative of the user segment, the extracting including applying a clustering technique to the users grouped in the user segment.

19. The one or more computing devices as recited in claim 17, wherein the one or more computing devices further comprise an access log that includes event data that includes the channel switching behavior of each user.

20. The one or more computing devices as recited in claim 17, wherein the acts further comprise:
   identifying one or more sessions for the subsequent user based at least in part on ones of the plurality of channels watched by the subsequent user, each said session including data regarding the watching of a respective said channel by the subsequent user;
   determining probabilities of the subsequent user watching each of the plurality of channels by, for each of the plurality of channels, dividing a number of said sessions during a time period in which the channel was watched by a total number of said sessions for the subsequent user during the time period;
   determining probabilities of the users switching from one said channel to another by, for each said channel pair including a first channel and a second channel, dividing a number of said sessions during the time period in which the second channel was watched immediately succeeding the first channel being watched by a total number of said sessions that the second channel was watched by any of the users during the time period; and
   determining the behavioral similarity of the subsequent user to each of the plurality of user segments by determining, for each of the plurality of user segments, a distance between browsing behavior features of the subsequent user and browsing behavior features of the set of exemplar users that are representative of the user segment.

* * * * *